(12) United States Patent
Nakatani et al.

(10) Patent No.: US 7,001,442 B2
(45) Date of Patent: Feb. 21, 2006

(54) PARTICULATE FILTER FOR AN INTERNAL COMBUSTION ENGINE AND METHOD FOR PRODUCING THE SAME

(75) Inventors: Koichiro Nakatani, Mishima (JP); Haruo Ooishi, Tagata-gun (JP); Shuji Watanabe, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 183 days.

(21) Appl. No.: 10/461,341

(22) Filed: Jun. 16, 2003

(65) Prior Publication Data

US 2003/0230080 A1    Dec. 18, 2003

(30) Foreign Application Priority Data

Jun. 18, 2002    (JP) .............................. 2002-177447

(51) Int. Cl.
*B01D 46/00*    (2006.01)

(52) U.S. Cl. ...................... 55/523; 55/282.2; 55/282.3; 55/385.3; 55/DIG. 5; 55/DIG. 10; 55/DIG. 30; 60/311; 428/116; 428/118; 264/628; 264/630; 264/638; 264/177.12; 264/209.3; 264/210.1; 264/210.2; 264/210.3; 264/DIG. 48

(58) Field of Classification Search .............. 55/282.2, 55/282.3, 385.3, 523, DIG. 5, DIG. 10, DIG. 30; 60/311; 428/116, 117, 118; 264/44, 628, 264/630, 631, 638, 639, 654, 655, 670, 177.12, 264/209.3, 209.4, 210.7, 210.2, 210.3, 210.4, 264/DIG. 48
See application file for complete search history.

(56) References Cited

U.S. PATENT DOCUMENTS

| | | | | |
|---|---|---|---|---|
| 4,276,071 A | * | 6/1981 | Outland ........................ | 55/523 |
| 4,283,210 A | | 8/1981 | Mochida et al. | |
| 4,416,676 A | * | 11/1983 | Montierth ..................... | 55/523 |
| 4,695,301 A | * | 9/1987 | Okajima et al. .............. | 55/523 |

(Continued)

FOREIGN PATENT DOCUMENTS

JP    A-57-007217    1/1982

(Continued)

*Primary Examiner*—Jason M. Greene
(74) *Attorney, Agent, or Firm*—Oliff & Berridge, PLC

(57) ABSTRACT

There is provided a particulate filter for trapping particulates contained in an exhaust gas discharged from a combustion chamber of an engine, comprising a plurality of exhaust gas flow passages each formed by three porous partitions extending substantially parallel with each other, each of the exhaust gas flow passages having a triangular cross section, wherein the partitions defining one of the adjacent exhaust gas flow passages are deformed at one end area of the filter so that the partitions at one end area of the filter approach each other toward one of the ends of the filter, the deformed portions of the partitions are connected to each other at their ends, thereby an opening of one of the adjacent exhaust gas flow passages is at least partially closed, the partitions defining the other exhaust gas flow passage are deformed at the other end area of the filter so that the partitions at the other end area of the filter approach each other toward the other end of the filter, and the deformed portions of the partitions are connected to each other at their ends, thereby an opening of the other exhaust gas flow passage is at least partially closed.

20 Claims, 6 Drawing Sheets

U.S. PATENT DOCUMENTS

| | | | |
|---|---|---|---|
| 4,732,593 A | 3/1988 | Kondo et al. | |
| 4,740,408 A * | 4/1988 | Mochida et al. | 55/523 |
| 5,851,250 A * | 12/1998 | Sugie et al. | 55/523 |
| 5,863,311 A | 1/1999 | Nagai et al. | |
| 5,961,931 A | 10/1999 | Ban et al. | |
| 6,863,705 B1 * | 3/2005 | Ishihara et al. | 55/523 |
| 2003/0000188 A1 * | 1/2003 | Harada et al. | 55/523 |
| 2004/0055264 A1 * | 3/2004 | Itoh | 55/523 |
| 2004/0206062 A1 * | 10/2004 | Ichikawa | 55/523 |
| 2005/0016141 A1 * | 1/2005 | Hong et al. | 55/523 |

FOREIGN PATENT DOCUMENTS

| | | |
|---|---|---|
| JP | 60225651 | 11/1985 |
| JP | A-61-183182 | 8/1986 |
| JP | A 8-508199 | 9/1996 |
| JP | A 2001-96113 | 4/2001 |
| JP | A 2001-162121 | 6/2001 |
| WO | WO 94/22556 | 10/1994 |
| WO | WO 94/22556 A * | 11/2004 |

\* cited by examiner

PARTICULATE FILTER FOR AN INTERNAL COMBUSTION ENGINE AND METHOD FOR PRODUCING THE SAME

BACKGROUND OF THE INVENTION

1. Field of the Invention

The present invention relates to a particulate filter for an internal combustion engine and a method for producing the same.

2. Description of the Related Art

A particulate filter for trapping particulates contained in exhaust gas exhausted from an internal combustion engine is disclosed in the official gazette of JP-T-8-508199. This particulate filter is provided with a plurality of exhaust gas flow passages defined by partitions. According to the technique disclosed in this official gazette, the partitions defining the exhaust gas flow passages are made of porous material. An opening of each exhaust gas flow passage on the upstream side and an opening of each exhaust gas flow passage on the downstream side are alternately closed, and thus exhaust gas can flow out from the filter after the exhaust gas has passed through the partitions.

In this connection, in the particulate filter disclosed in the above official gazette, the partitions in the opening regions of the exhaust gas flow passages are deformed so that they can approach each other and the forward end portions of these partitions are connected with each other, and thus the openings of the exhaust gas flow passages are closed. In the case where the openings of the exhaust gas flow passages are closed in this way, the partitions can be easily deformed when a quantity of deformation of the partitions to close the openings of the exhaust gas flow passages is small. In general, it is preferable that the mechanical strength of the particulate filter is high.

It is an object of the present invention to reduce a quantity of deformation of partitions, to close openings of exhaust gas flow passages of a particulate filter, as much as possible. It is also an object of the present invention to enhance the mechanical strength of a particulate filter as much as possible.

SUMMARY OF THE INVENTION

According to the first aspect of the invention, there is provided a particulate filter for trapping particulates contained in an exhaust gas discharged from a combustion chamber of an engine, comprising
a plurality of exhaust gas flow passages each formed by three porous partitions extending substantially parallel with each other, each of the exhaust gas flow passages having a triangular cross section,
wherein the partitions defining one of the adjacent exhaust gas flow passages are deformed at one end area of the filter so that the partitions at one end area of the filter approach each other toward one of the ends of the filter, the deformed portions of the partitions are connected to each other at their ends, thereby an opening of one of the adjacent exhaust gas flow passages is at least partially closed, the partitions defining the other exhaust gas flow passage are deformed at the other end area of the filter so that the partitions at the other end area of the filter approach each other toward the other end of the filter, and the deformed portions of the partitions are connected to each other at their ends, thereby an opening of the other exhaust gas flow passage is at least partially closed.

According to the second aspect of the invention, the openings of the exhaust gas flow passages are completely closed by the deformed portions of the partitions.

According to the third aspect of the invention, the openings of the exhaust gas flow passages are partially closed by the deformed portions of the partitions.

According to the fourth aspect of the invention, each of the holes defined by the deformed portions of the partitions which partially close the openings of the exhaust gas flow passages has a size larger than that of a pore defined in the partitions.

According to the fifth aspect of the invention, each of the openings of the triangular cross-section exhaust gas flow passages which are not closed by the deformed portions of the partitions has a hexagonal cross section.

According to the sixth aspect of the invention, the openings of the exhaust gas flow passages are completely closed by the deformed portions of the partitions at one end area of the filter, and the openings of the exhaust gas flow passages are partially closed by the deformed portions of the partitions at the other end area of the filter.

According to the seventh aspect of the invention, each of holes defined by the deformed portions of the partitions which partially close the openings of the exhaust gas flow passages has a size larger than that of a pore defined in the partitions.

According to the eighth aspect of the invention, each of the exhaust gas flow passages has a regular triangular cross section.

According to the ninth aspect of the invention, the deformed portions of the partitions extend obliquely relative to the longitudinal direction of the exhaust gas flow passage.

According to the tenth aspect of the invention, the deformed portions of the partitions which extend obliquely relative to the longitudinal direction of the exhaust gas flow passage define a sharp tip.

According to the eleventh aspect of the invention, the filter further comprises a plurality of exhaust gas flow passages each formed by four porous partitions extending substantially parallel with each other, each of the exhaust gas flow passages having a quadrangular cross section, the partitions defining one of the adjacent quadrangular-cross-section exhaust gas flow passages are deformed at one end area of the filter so that the partitions at one end area of the filter approach each other toward one of the ends of the filter, the deformed portions of the partitions are connected to each other at their ends, thereby an opening of one of the adjacent quadrangular-cross-section exhaust gas flow passages is at least partially closed, the partitions defining the other quadrangular-cross-section exhaust gas flow passage are deformed at the other end area of the filter so that the partitions at the other end area of the filter approach each other toward the other end of the filter, and the deformed portions of the partitions are connected to each other at their ends, whereby an opening of the other quadrangular-cross-section exhaust gas flow passage is at least partially closed.

According to the twelfth aspect of the invention each of the openings of the quadrangular-cross-section exhaust gas flow passages which are not closed by the deformed portions of the partitions has a quadrangular cross section.

According to the thirteenth aspect of the invention, each of the quadrangular-cross-section exhaust gas flow passages has a square cross section.

According to the fourteenth aspect of the invention, the deformed portions of the partitions extend obliquely relative to the longitudinal direction of the exhaust gas flow passage.

According to the fifteenth aspect of the invention, the deformed portions of the partitions which extend obliquely relative to the longitudinal direction of the exhaust gas flow passage define a sharp tip.

According to the sixteenth aspect of the invention, the triangular-cross-section exhaust gas flow passages are located at an area where the large amount of the exhaust gas flows into, and the quadrangular-cross-section exhaust gas flow passages are located around the area where the triangular-cross-section exhaust gas flow passages are located.

According to the seventeenth aspect of the invention, the triangular-cross-section and quadrangular-cross-section exhaust gas flow passages are distributed at a predetermined ratio.

According to the eighteenth aspect of the invention, the triangular-cross-section and quadrangular-cross-section exhaust gas flow passages are located in the manner of a predetermined pattern.

According to the nineteenth aspect of the invention, the triangular-cross-section exhaust gas flow passages are located around a central axis of the filter, and the quadrangular-cross-section exhaust gas flow passages are located around the area where the triangular-cross-section exhaust gas flow passages are located.

According to the twentieth aspect of the invention, the triangular-cross-section exhaust gas flow passages are located around a central axis of the filter and at an area remote from the area around the central axis of the filter, and the quadrangular-cross-section exhaust gas flow passages are located in the remaining area.

According to the twenty-first aspect of the invention, there is provided a method for producing a particulate filter for trapping particulates contained in an exhaust gas discharged from a combustion chamber of an engine, comprising steps of:

preparing a base material having a plurality of exhaust gas flow passages each formed by three porous partitions extending substantially parallel with each other, each of the exhaust gas flow passages having a triangular cross section, deforming the partitions defining one of the adjacent exhaust gas flow passages of the base material at one end area of the base material so that the partitions at one end area of the base material approach each other toward one of the ends of the base material to at least partially close an opening of one of the adjacent exhaust gas flow passages and so that each of the openings of the triangular cross-section exhaust gas flow passages which are not closed by the partitions has a hexagonal cross section, and deforming the partitions defining the other exhaust gas flow passage of the base material at the other end area of the base material so that the partitions at the other end area of the base material approach each other toward the other end of the base material to at least partially close an opening of the other exhaust gas flow passage and so that each of the openings of the triangular cross-section exhaust gas flow passages, which are not closed by the partitions, has a hexagonal cross section.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
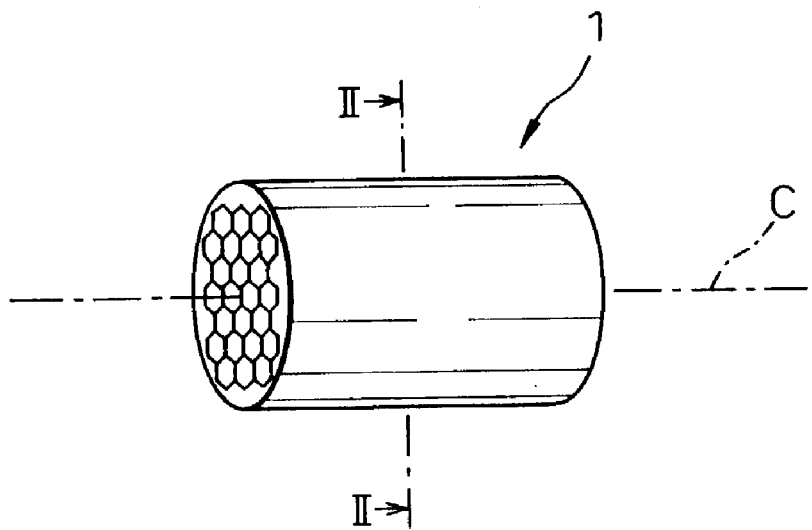
FIG. 1 is a perspective view showing a particulate filter of the first embodiment.

Referring to the drawings, the present invention will be explained as follows. FIG. 1 is a view showing a particulate filter of the first embodiment. The particulate filter 1 of the first embodiment, which will be referred to as a filter hereinafter, is cylindrical. Although the structure of the particulate filter 1 will be described in detail later, the particulate filter 1 includes a plurality of exhaust gas flow passages extending in parallel with the central axis C.

Figure 2:
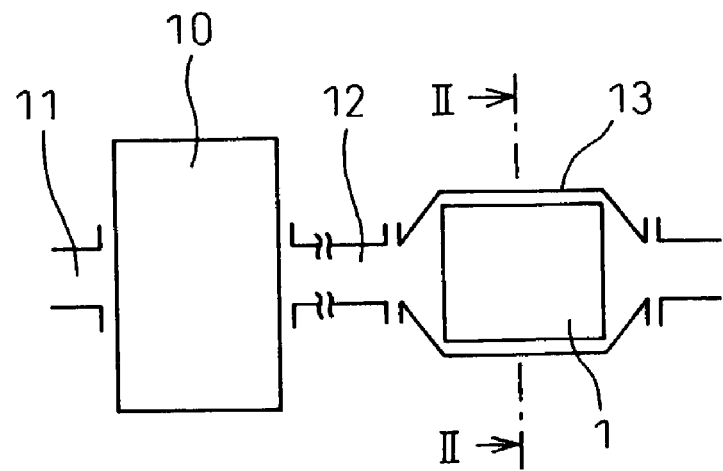
FIG. 2 is a view showing an internal combustion engine provided with the particulate filter of the first embodiment.

FIG. 2 is a view showing an example in which the filter 1 of the first embodiment is used. In FIG. 2, reference numeral 10 is an internal combustion engine body, reference numeral 11 is an intake passage and reference numeral 12 is an exhaust passage. The exhaust passage 12 is connected with the casing 13. The filter 1 is arranged in the casing 13. When the filter 1 is used as described above, exhaust gas exhausted from a combustion chamber (not shown) formed in the internal combustion engine body 10 flows to the filter 1 via the exhaust passage 12. After the exhaust gas has arrived at the filter 1, it flows into the filter 1 from one circular end face of the filter 1 and flows outside the filter 1 from the other circular end face. In the following explanations, one side of the filter 1 into which the exhaust gas flows will be referred to as an upstream side, and the other side of the filter 1 from which the exhaust gas flows out will be referred to as a downstream side.

It is possible for the filter 1 to trap particulates contained in the exhaust gas. An example of the internal combustion engine, on which the above filter to trap particulates is mounted, is a compression ignition type internal combustion engine, in the combustion chamber of which particulates mainly made of carbon are generated. Of course, the structure of the filter 1 of the present invention can be applied to not only the filter for trapping particulates contained in the exhaust gas but also a catalyst support for supporting a catalyst to purify specific components contained in the exhaust gas.

Figure 3A:
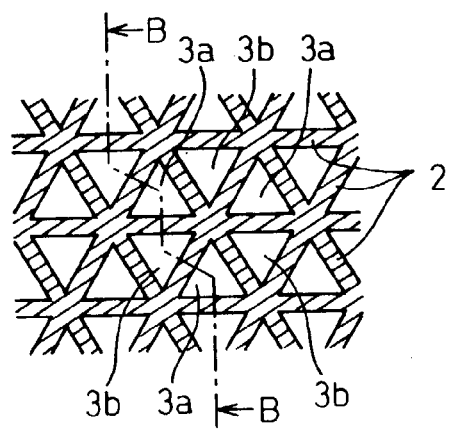
FIG. 3A is a sectional view of the particulate filter of the first embodiment taken on line II—II in FIGS. 1 and 2.
Figure 3B:
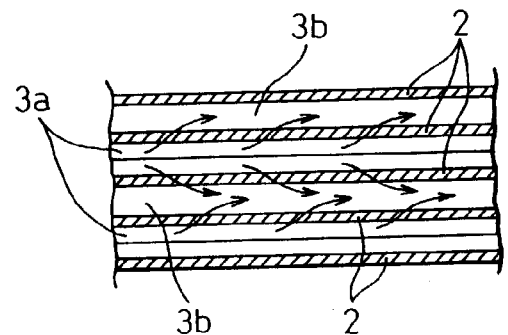
FIG. 3B is a sectional view of the particulate filter of the first embodiment taken on line B—B in FIG. 3A.

FIG. 3A is a sectional view showing a portion of the particulate filter taken on line II—II in FIGS. 1 and 2. FIG. 3B is a sectional view of the particulate filter taken on line B—B in FIG. 3A.

As shown in FIG. 3B, the filter 1 includes a plurality of partitions 2 extending in parallel with the central axis C (shown in FIG. 1). These partitions 2 extend from one circular end face of the filter 1 to the other circular end face. The partitions 2 are made of porous material. Accordingly, there are provided a large number of fine holes in the partitions 2. As shown in FIG. 3A, the filter 3 is provided with a plurality of exhaust gas flow passages 3a, 3b, the cross sections of which are formed into a regular triangle, and these exhaust gas flow passages 3a, 3b are defined by three partitions 2.

Although the detail will be described later, in the first embodiment, the exhaust gas flow passage 3a, which is one of the two adjoining exhaust gas flow passages 3a, 3b, is completely closed at one end portion, and the exhaust gas flow passage 3b, which is the other of the two adjoining exhaust gas flow passages 3a, 3b, is completely closed at the other end portion. In other words, an opening of one end portion of the exhaust gas flow passage 3a and an opening of the other end portion of the exhaust gas flow passage 3b are alternately closed. That is, at one end portion, the opening of the end portion of one exhaust gas flow passage 3a is not closed (the opening of the end portion of one exhaust gas flow passage 3a is opened), and the opening of the end portion of the other exhaust gas flow passage 3b is closed. At the other end portion, the opening of the end portion of one exhaust gas flow passage 3a is closed, and the opening of the end portion of the other exhaust gas flow passage 3b is not closed (the opening of the end portion of the other exhaust gas flow passage 3b is opened).

Accordingly, after the exhaust gas has arrived at the filter 1, first, it flows into the exhaust gas flow passage 3a, the opening of the end portion on the upstream side of which is not closed, which will be referred to as an exhaust gas flow-in passage hereinafter. Then, the exhaust gas passes through the partition 2 and flows into the adjoining exhaust gas flow passage 3b, which will be referred to as an exhaust gas flow-out passage hereinafter. Finally, the exhaust gas flows out from the filter 1 via the opening of the end portion on the downstream side of the exhaust gas flow-out passage 3b. A state of the above exhaust gas flow in the filter 1 is shown by the arrow in FIG. 3B.

Figure 4:
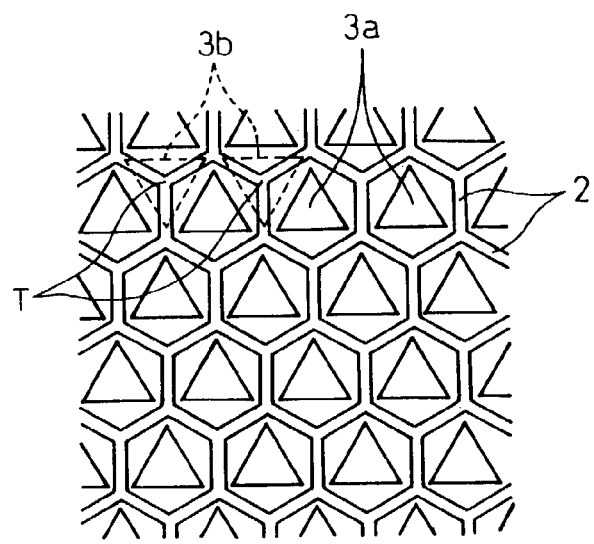
FIG. 4 is an end face view showing a primary portion of the particulate filter of the first embodiment.

FIG. 4 is a view showing a portion of the filter end face of the first embodiment, wherein this view is taken from the upstream side. As shown in FIG. 4, three partitions 2 defining each exhaust gas flow-out passage 3b are connected with each other at the end portions on the upstream side so that the opening of the exhaust gas flow-out passage 3b concerned on the upstream side can be closed. Portions of the partitions 2, which are adjacent to the partition end portions connected with each other, are formed, by being inclined, so that they can approach the filter end face on the upstream side. These inclined portions of the partitions, which will be referred to as inclined walls, are formed so that they can gather to a portion shown by reference numeral T in FIG. 4. That is, the inclined walls are formed in such a manner that the portion shown by reference numeral T in FIG. 4 is a vertex and the inclined walls extend from this vertex T. In other words, the inclined walls are formed into a peaked shape, the vertex of which is the portion T. As described above, as the partitions 2 defining the exhaust gas flow-out passage 3b of the end portion region on the upstream side are inclined, the partitions 2 defining the exhaust gas flow-in passage 3a of the end portion region on the upstream side are inclined so that they can be separate from each other toward the filter end face on the upstream side, and a cross section of the end opening of the exhaust gas flow-in passage 3a on the upstream side is formed into a regular hexagon.

On the other hand, although not shown in the drawing, three partitions 2 defining the exhaust gas flow-in passage 3a are connected with each other at the end portions on the downstream side so that the opening of the exhaust gas flow-in passage 3a on the downstream side can be closed. Portions of the partitions 2 adjacent to the partition end portions, which are connected with each other, are inclined so that they can approach each other toward the filter end face on the downstream side. In the same manner as that of the inclined walls on the upstream side, these inclined partition portions are formed in such a manner that they extend from the vertex. In other words, they are formed into a peaked shape having the vertex. As described above, as the partitions 2 defining the exhaust gas flow-in passage 3a of the end portion region on the downstream side are inclined, the partitions 2 defining the exhaust gas flow-out passage 3b of the end portion region on the downstream side are inclined so that they can be separate from each other toward the filter end face on the downstream side, and a cross section of the end opening of the exhaust gas flow-out passage 3b on the downstream side is formed into a regular hexagon.

Figure 5A:
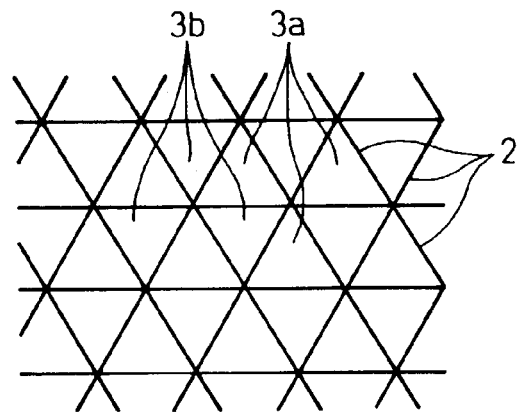
FIG. 5A is a view showing an end face of the particulate filter of the first embodiment in the first step of the method of closing an opening of an end portion.
Figure 5B:
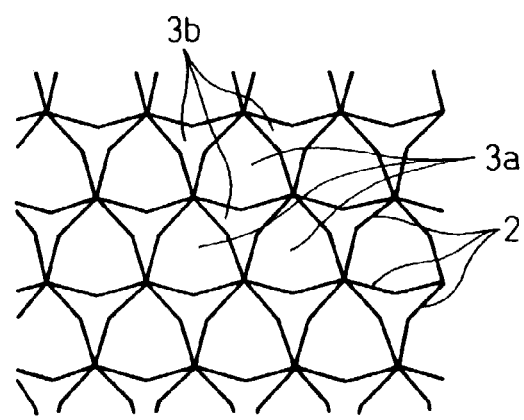
FIG. 5B is a view showing an end face of the particulate filter of the first embodiment in the second step of the method of closing an opening of an end portion.
Figure 5C:
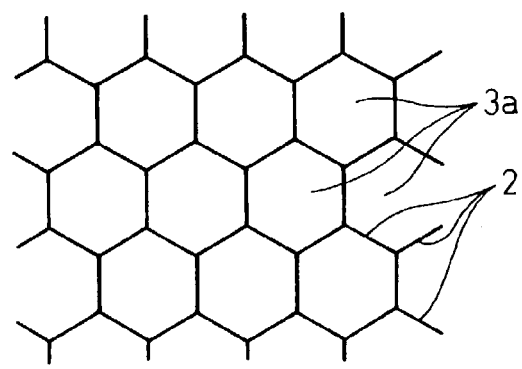
FIG. 5C is a view showing an end face of the particulate filter of the first embodiment in the third step of the method of closing an opening of an end portion.

Next, referring to FIGS. 5A to 5C, a method of closing the end opening of the exhaust gas flow passage will be explained below. In this connection, FIGS. 5A to 5C are views showing a portion of the filter end face, wherein the view is taken from the upstream side. However, in order to enhance the understanding of the explanation, only the forward end portions of the partitions on the upstream side are shown by solid lines. The method of closing the end opening of the exhaust gas flow-out passage on the upstream side will be explained below. A method of closing the end opening of the exhaust gas flow-in passage on the downstream side is the same as the method of closing the end opening of the exhaust gas flow-out passage on the upstream side. Therefore, the explanations are omitted here.

In the first embodiment, there is prepared a base material having the partitions 2, which cross each other forming a regular triangle, so that a plurality of exhaust gas passages 3a, 3b, the cross sections of which are formed into regular triangles, can be formed. Accordingly, as shown in FIG. 5A, the forward end portions of the partitions 2 cross each other so that they can be formed into a plurality of regular triangles. In this case, as shown in FIG. 5B, the end portions of the partitions 2 are deformed so that the forward end portions of the three partitions 2 defining one exhaust gas flow passage 3b of the two adjoining exhaust gas flow passages 3a, 3b can approach each other. The forward end portions of the three partitions 2 are connected with each other, and as shown in FIG. 5C, the end opening of one exhaust gas flow passage 3b is closed by the partitions 2, and the cross section of the end opening of the other exhaust gas flow passage 3a is formed into a regular hexagon.

The filter of the first embodiment provides the following advantages. As the partitions 2 defining the exhaust gas flow-in passage 3a in the vicinity of the end opening on the upstream side are inclined, the exhaust gas can easily flow into the exhaust gas flow-in passage 3a. Accordingly, it is possible to reduce a pressure loss caused by the filter 1. As the partitions 2 defining the exhaust gas flow-out passage 3b in the vicinity of the end opening on the downstream side are inclined, the exhaust gas can easily flow out from the exhaust gas flow-out passage 3b. Accordingly, it is possible to further reduce a pressure loss caused by the filter 1.

Further, in the first embodiment, as the partitions 2 are formed into a regular triangle, the mechanical strength of the filter 1 is higher than that of the filter 1, the partitions of which are formed into a square. Furthermore, in the first embodiment, the partitions 2 deformed to close the end openings of the exhaust gas flow passages 3a, 3b are formed into a regular triangle. Therefore, a quantity of deformation of deforming the partitions 2 so as to close the end openings of the exhaust gas flow passages 3a, 3b is smaller than that in a case in which the partitions are formed into a square. Therefore, according to the first embodiment, there is a low possibility that the partitions 2 are damaged when they are deformed.

In this connection, in the first embodiment, the partitions cross each other forming a regular triangle. However, even when the partitions are not formed into a regular triangle but the partitions cross each other simply forming a triangle, the present invention can provide the same effect as that of the first embodiment. The end opening of the first embodiment, which is not closed, is formed into a regular hexagon, however, according to the structure of the partitions, the end opening, which is not closed, may not be formed into a regular hexagon but the end opening, which is not closed, may be simply formed into a hexagon.

Figure 6:
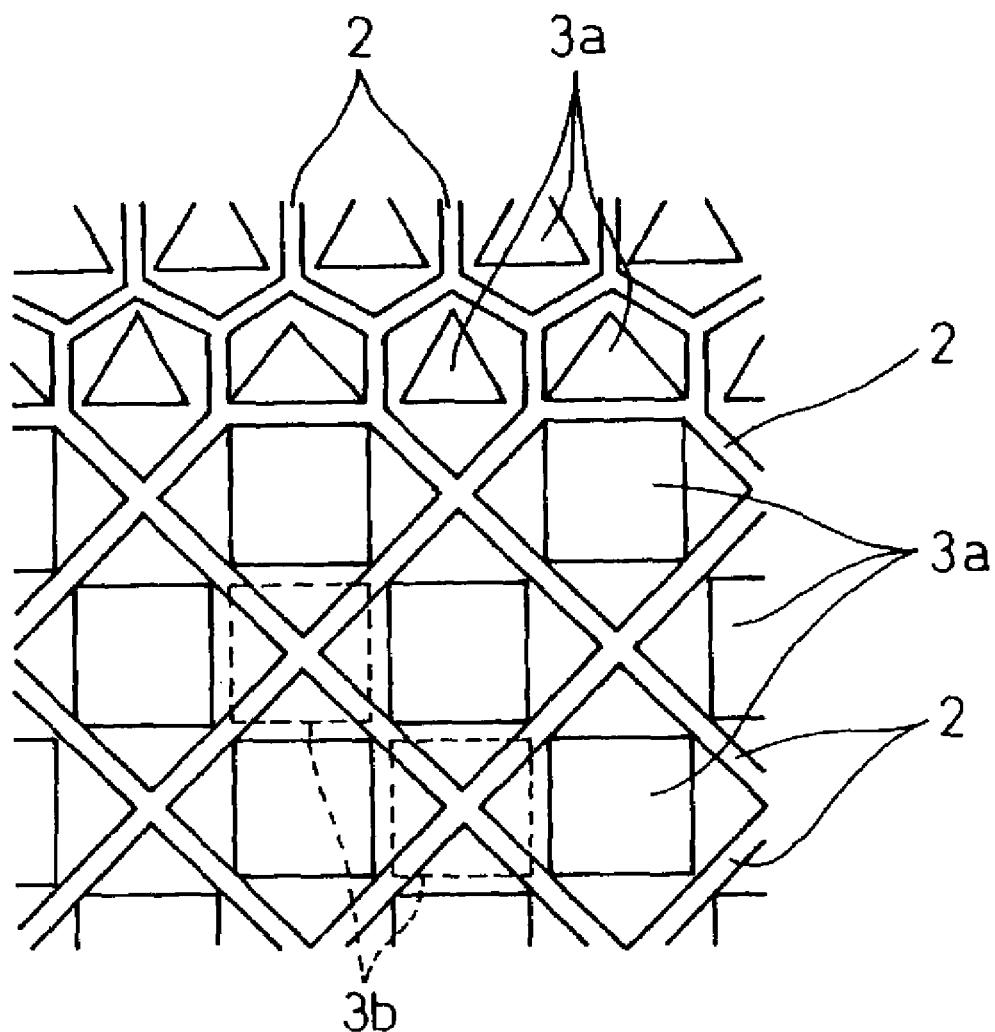
FIG. 6 is an end face view showing a primary portion of the particulate filter of the second embodiment.

Next, the filter of the second embodiment will be explained below. FIG. 6 is a view showing a portion of the filter end face of the second embodiment, wherein this view is taken from the upstream side. As shown in FIG. 6, the filter 1 of the second embodiment includes a plurality of exhaust gas flow passages 3a, 3b, the cross sections of which are formed into a regular triangle, which are defined by three partitions 2. At the same time, the filter 1 of the second embodiment includes a plurality of exhaust gas flow passages 3a, 3b, the cross sections of which are formed into a square, which are defined by four partitions 2. The region in which the exhaust gas flow passages, the cross sections of which are formed into a regular triangle, gather will be referred to as a regular triangle cross section region, and the region in which the exhaust gas flow passages, the cross sections of which are formed into a square, gather will be referred to as a square cross section region.

In the second embodiment, in the same manner as that of the first embodiment, in any of the regular triangle cross section region and the square cross section region, one exhaust gas flow passage 3a of the two adjoining exhaust gas flow passages 3a, 3b is closed at one end portion, and the other exhaust gas flow passage 3b of the two adjoining exhaust gas flow passages 3a, 3b is closed at the other end portion. In the same manner as that of the first embodiment, in any of the regular triangle cross section region and the square cross section region, the partitions 2 defining the exhaust gas flow-out passage 3b are inclined so that they can approach each other toward the filter end face on the upstream side in the end region on the upstream side. The forward end portions of these inclined partitions are connected with each other. Accordingly, the end opening on the upstream side of the exhaust gas flow passage 3b is closed by these inclined partitions 2.

In any of the regular triangle cross section region and the square cross section region, the partitions 2 defining the exhaust gas flow-out passage 3b in the end region on the upstream side are inclined. Therefore, the partitions 2 defining the exhaust gas flow-in passage 3a in the end region on the upstream side are inclined so that they can be separate from each other toward the filter end face on the upstream side. In the regular triangle cross section region, the cross section of the end opening on the upstream side of the exhaust gas flow-in passage 3a is formed into a regular hexagon, however, in the square cross section region, the cross section of the end opening on the upstream side of the exhaust gas flow-in passage 3a is formed into a square.

On the other hand, although not shown in the drawing, in the same manner as that of the first embodiment, in any of the regular triangle cross section region and the square cross section region, the partitions 2 defining the exhaust gas flow-in passage 3a are inclined so that they can approach each other toward the filter end face on the downstream side in the end region on the downstream side. The forward end portions of these inclined partitions are connected with each other. Accordingly, the end opening on the downstream side of the exhaust gas flow-in passage 3a is closed by these inclined partitions 2.

In any of the regular triangle cross section region and the square cross section region, the partitions 2 defining the exhaust gas flow-in passage 3a in the end region on the downstream side are inclined. Therefore, the partitions 2 defining the exhaust gas flow-out passage 3b in the end region on the downstream side are inclined so that they can be separate from each other toward the filter end face on the downstream side. In the regular triangle cross section region, the cross section of the end opening on the downstream side of the exhaust gas flow-out passage 3b is formed into a regular hexagon, however, in the square cross section region, the cross section of the end opening on the downstream side of the exhaust gas flow-out passage 3b is formed into a square.

In this connection, in the second embodiment, the length of one side of the exhaust gas flow passage, the cross section of which is a regular triangle, is equal to the length of one side of the exhaust gas flow passage, the cross section of which is a square.

Figure 7A:
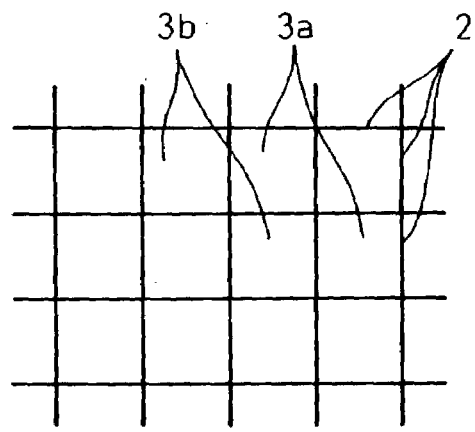
FIG. 7A is a view showing an end face of the particulate filter of the second embodiment in the first step of the method of closing an opening of an end portion.
Figure 7B:
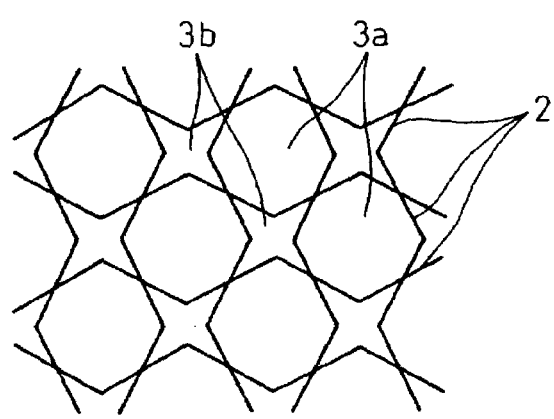
FIG. 7B is a view showing an end face of the particulate filter of the second embodiment in the second step of the method of closing an opening of an end portion.
Figure 7C:
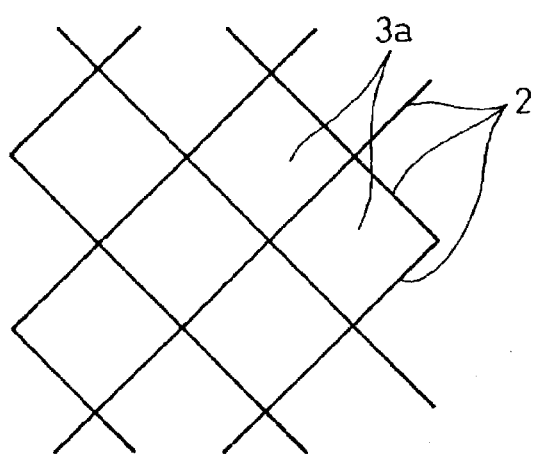
FIG. 7C is a view showing an end face of the particulate filter of the second embodiment in the third step of the method of closing an opening of an end portion.

Next, referring to FIGS. 7A to 7C, a method of closing the end opening of the exhaust gas flow passage, the cross section of which is a square, will be explained below. In this connection, FIGS. 7A to 7C are views showing a portion of the filter end face, wherein the view is taken from the upstream side. However, in order to enhance the understanding of the explanation, only the forward end portions of the partitions on the upstream side are shown by solid lines. The method of closing the end opening of the exhaust gas flow-out passage, the cross section of which is a square, on the upstream side will be explained below. A method of closing the end opening of the exhaust gas flow-in passage, the cross section of which is a square, on the downstream side is the same as the method of closing the end opening of the exhaust gas flow-out passage on the upstream side. Therefore, the explanations of the closing method are omitted here. A method of closing the end opening of the exhaust gas flow passage, the cross section of which is a regular triangle, is the same as the method of closing of the first embodiment. Therefore, explanations of the method of closing will be omitted here.

In the second embodiment, there is prepared a base material having the partitions 2, which cross each other forming a regular triangle, so that a plurality of exhaust gas passages 3a, 3b, the cross sections of which are formed into a regular triangle, can be formed. There is also prepared a base material having the partitions 2, which cross each other forming a square, so that a plurality of exhaust gas passages 3a, 3b, the cross sections of which are formed into a square, can be formed. Accordingly, as shown in FIG. 7A, the forward end portions of the partitions 2 in the square cross section region cross each other so that they can be formed into a plurality of squares. In this case, as shown in FIG. 7B, the end portions of the partitions 2 are deformed so that the forward end portions of the four partitions 2 defining one exhaust gas flow passage 3b of the two adjoining exhaust gas flow passages 3a, 3b, the cross section of which is a square, can approach each other. The forward end portions of the four partitions 2 are connected with each other, and as shown in FIG. 7C, the end opening of one exhaust gas flow passage 3b is closed by the partition 2, and the cross section of the end opening of the other exhaust gas flow passage 3a is formed into a square.

In this connection, the exhaust gas is more likely to flow into an exhaust gas flow passage, the cross section of which is a square, than an exhaust gas flow passage, the cross section of which is a regular triangle. In other words, a pressure loss caused by the exhaust gas flow passage, the cross section of which is a regular triangle, is larger than a pressure loss caused by the exhaust gas flow passage, the cross section of which is a square. The mechanical strength of the filter, which is composed of partitions crossing each other by being formed into a regular triangle, is higher than the mechanical strength of the filter, which is composed of partitions crossing each other being formed into a square.

Accordingly, in the case of the second embodiment having both the regular triangle cross section region and the square cross section region, when a ratio of the distribution of the regular triangle cross section region and the square cross section region is changed, it is possible to change the pressure loss and the mechanical strength of the filter. Therefore, in the present invention, according to the required pressure loss and mechanical strength of the filter, the regular triangle cross section region and the square cross section region are arranged in a predetermined pattern at a predetermined ratio of the regular triangle cross section region to the square cross section region.

For example, in the present invention, in order to suppress a pressure loss of the overall filter, the regular triangle cross section region is arranged in a region in which exhaust gas concentrates, and the square cross section region is arranged round the regular triangle cross section region. Due to the above arrangement, after the exhaust gas has once arrived at the regular triangle cross section region, a portion of the exhaust gas is directed to the square section region because the pressure loss of the regular triangle cross section region is large. This portion of the exhaust gas flows into the square cross section region. Due to the foregoing, the exhaust gas, which has arrived at the filter, flows relatively uniformly into the filter from the overall end face of the filter. Therefore, the overall pressure loss of the filter can be suppressed.

Figure 8A:
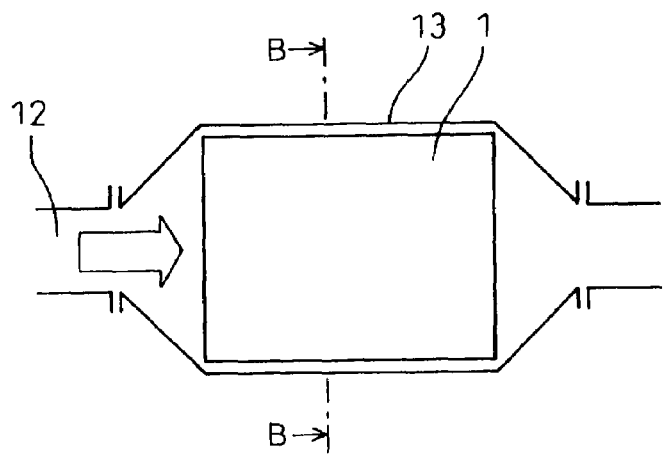
FIG. 8A is a sectional view showing a particulate filter of the second embodiment.
Figure 8B:
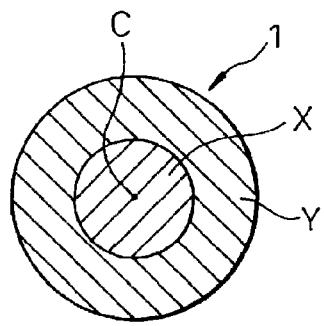
FIG. 8B is a sectional view taken on line B—B in FIG. 8A.

In the second embodiment, as shown in FIG. 8A, the exhaust gas arriving at the filter 1 concentrates in the end face region round the central axis C of the filter 1. Therefore, as shown in FIG. 8B which is a sectional view taken on line B—B in FIG. 8A, the regular triangle cross section region X is arranged round the central axis C of the filter 1. Round the regular triangle cross section region X, that is, in the periphery of the region round the central axis C of the filter 1, the square cross section region Y is arranged.

Figure 9:
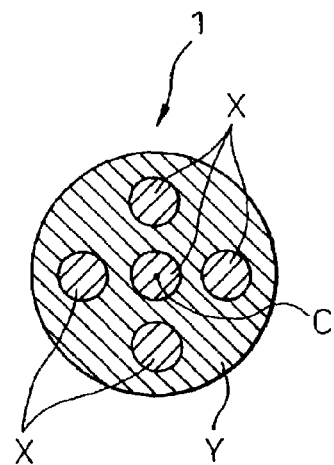
FIG. 9 is a sectional view showing a particulate filter of the third embodiment.

As shown in FIG. 9 of the third embodiment, the regular triangle cross section regions X may be arranged in the region round the central axis C of the filter 1 and in the four regions distant from this region, and the square cross section regions may be arranged in the residual regions.

In this connection, in general, when a porosity of the partitions of the filter is increased, the pressure loss caused by the filter can be lowered, however, the mechanical strength of the filter is also lowered. However, as shown in the second and the third embodiment, when the mechanical strength of the filter is enhanced by appropriately combining the square cross section region with the regular triangle cross section region, it is possible to increase the porosity of the partitions in accordance with the increase in the mechanical strength of the filter. Of course, in the first embodiment, all regions of the filter are composed of the regular triangle cross section regions. Therefore, the mechanical strength of the filter is so high that the porosity of the partitions can be increased, which reduces the pressure loss caused by the filter. In the second embodiment, the cross section of the exhaust gas flow passage is not limited to a square. For example, the cross section of the exhaust gas flow passage may be a rectangle.

In the embodiment described above, an opening on the upstream side of each exhaust gas flow-out passage is completely closed by the partitions. However, it is possible to apply the present invention to an embodiment in which the opening of the upstream end of each exhaust gas flow-out passage is partially closed by the partitions partially connected with each other, and by these partially connected partitions, in the forward end regions of these partitions, that is, in a portion shown by the reference numeral T in FIG. 4, a small hole, which is larger than the fine hole (average fine hole diameter) of the partition, however, smaller than the exhaust gas flow-out passage concerned, penetrates to the exhaust gas flow-out passage. Of course, the present invention can be applied to an embodiment in which the opening on the downstream side of each exhaust gas flow-in passage is partially closed by the partitions partially connected with each other, and by the partitions partially connected with each other, a small hole, which is larger than the fine hole (average fine hole diameter) of the partition and smaller than the exhaust gas flow-in passage, is formed at the forward end region of the partition penetrating to the exhaust gas flow-in passage concerned.

According to the present invention, the particulate filter is composed of partitions which are formed into triangles. Therefore, the mechanical strength of the overall particulate filter is high. In the present invention, the end portions of the partitions are deformed by being inclined, and the forward end portions of the partitions are connected with each other. However, these partitions are formed into a triangle. Therefore, the quantity of deformation of the end portions of these partitions is relatively small.

While the invention has been described by reference to specific embodiments chosen for purposes of illustration, it should be apparent that numerous modifications could be made thereto by those skilled in the art without departing from the basic concept and scope of the invention.

What is claimed is:

1. A particulate filter for trapping particulates contained in an exhaust gas discharged from a combustion chamber of an engine, comprising a plurality of exhaust gas flow passages each formed by three porous partitions extending substantially parallel with each other, each of the exhaust gas flow passages having a triangular cross section, wherein the partitions defining one of the adjacent exhaust gas flow passages are deformable at one end area of the filter so that the partitions at one end area of the filter approach each other toward one of the ends of the filter, the deformable portions of the partitions are connected to each other at their ends, thereby an opening of one of the adjacent exhaust gas flow passages is at least partially closed, wherein the partitions defining the other exhaust gas flow passage are deformable at the other end area of the filter so that the partitions at the other end area of the filter approach each other toward the other end of the filter, the deformable portions of the partitions are connected to each other at their ends, thereby an opening of the other exhaust gas flow passage is at least partially closed, and wherein each of the openings, which are not closed by the deformable portions of the partitions, are deformable into a hexagonal cross section.

2. A particulate filter set forth in claim 1 wherein the openings of the exhaust gas flow passages are completely closed by the deformable portions of the partitions.

3. A particulate filter set forth in claim 1 wherein the openings of the exhaust gas flow passages are partially closed by the deformable portions of the partitions.

4. A particulate filter set forth in claim 3 wherein each of holes defined by the deformable portions of the partitions which partially close the openings of the exhaust gas flow passages has a size larger than that of a pore defined in the partitions.

5. A particulate filter set forth in claim 1 wherein the openings of the exhaust gas flow passages are completely closed by the deformable portions of the partitions at one end area of the filter, and the openings of the exhaust gas flow passages are partially closed by the deformable portions of the partitions at the other end area of the filter.

6. A particulate filter set forth in claim 5 wherein each of holes defined by the deformable portions of the partitions which partially close the openings of the exhaust gas flow passages has a size larger than that of a pore defined in the partitions.

7. A particulate filter set forth in claim 1 wherein each of the exhaust gas flow passages has a regular triangular cross section.

8. A particulate filter set forth in claim 1 wherein the deformable portions of the partitions extend obliquely relative to the longitudinal direction of the exhaust gas flow passage.

9. A particulate filter set forth in claim 8 wherein the deformable portions of the partitions which extend obliquely relative to the longitudinal direction of the exhaust gas flow passage define a sharp tip.

10. A particulate filter set forth in claim 1 wherein the filter further comprises a plurality of exhaust gas flow passages each formed by four porous partitions extending substantially parallel with each other, each of the exhaust gas flow passages having a quadrangular cross section, the partitions defining one of the adjacent quadrangular-cross-section exhaust gas flow passages are deformable at one end area of the filter so that the partitions at one end area of the filter approach each other toward one of the ends of the filter, the deformable portions of the partitions are connected to each other at their ends, thereby an opening of one of the adjacent quadrangular-cross-section exhaust gas flow passages is at least partially closed, the partitions defining the other quadrangular-cross-section exhaust gas flow passage are deformable at the other end area of the filter so that the partitions at the other end area of the filter approach each other toward the other end of the filter, and the deformable portions of the partitions are connected to each other at their ends, whereby an opening of the other quadrangular-cross-section exhaust gas flow passage is at least partially closed.

11. A particulate filter set forth in claim 10 wherein each of the openings of the quadrangular-cross-section exhaust gas flow passages which are not closed by the deformable portions of the partitions has a quadrangular cross section.

12. A particulate filter set forth in claim 10 wherein each of the quadrangular-cross-section exhaust gas flow passages has a square cross section.

13. A particulate filter set forth in claim 10 wherein the deformable portions of the partitions extend obliquely relative to the longitudinal direction of the exhaust gas flow passage.

14. A particulate filter set forth in claim 10 wherein the deformable portions of the partitions which extend obliquely relative to the longitudinal direction of the exhaust gas flow passage define a sharp tip.

15. A particulate filter set forth in claim 10 wherein the triangular-cross-section exhaust gas flow passages are located at an area where the large amount of the exhaust gas flows in, and the quadrangular-cross-section exhaust gas flow passages are located around the area where the triangular-cross-section exhaust gas flow passages are located.

16. A particular filter set forth in claim 10 wherein the triangular-cross-section and quadrangular-cross-section exhaust gas flow passages are distributed at a predetermined ratio.

17. A particular filter set forth in claim 10 wherein the triangular-cross-section and quadrangular-cross-section exhaust gas flow passages are located in the manner of a predetermined pattern.

18. A particulate filter set forth in claim 17 wherein the triangular-cross-section exhaust gas flow passages are located around a central axis of the filter, and the quadrangular-cross-section exhaust gas flow passages are located around the area where the triangular-cross-section exhaust gas flow passages are located.

19. A particulate filter set forth in claim 17 wherein the triangular-cross-section exhaust gas flow passages are located around a central axis of the filter and at an area remote from the area around the central axis of the filter, and the quadrangular-cross-section exhaust gas flow passages are located in the remaining area.

20. A method for producing a particulate filter for trapping particulates contained in an exhaust gas discharged from a combustion chamber of an engine, comprising steps of:

preparing a base material having a plurality of exhaust gas flow passages each formed by three porous partitions extending substantially parallel with each other, each of the exhaust gas flow passages having a triangular cross section, deforming the partitions defining one of the adjacent exhaust gas flow passages of the base material at one end area of the base material so that the partitions at one end area of the base material approach each other toward one of the ends of the base material to at least partially close an opening of one of the adjacent exhaust gas flow passages and so that each of the openings of the triangular cross-section exhaust gas flow passages which are not closed by the partitions has a hexagonal cross section, and deforming the partitions defining the other exhaust gas flow passage of the base material at the other end area of the base material so that the partitions at the other end area of the base material approach each other toward the other end of the base material to at least partially close an opening of the other exhaust gas flow passage and so that each of the openings of the triangular cross-section exhaust gas flow passages, which are not closed by the partitions, has a hexagonal cross section.

* * * * *